(12) United States Patent
Henderson et al.

(10) Patent No.: US 11,780,426 B2
(45) Date of Patent: Oct. 10, 2023

(54) METHOD FOR ESTIMATING A LONGITUDINAL FORCE DIFFERENCE ACTING ON STEERED WHEELS

(71) Applicant: Volvo Truck Corporation, Gothenburg (SE)

(72) Inventors: Leon Henderson, Härryda (SE); Leo Laine, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 3 days.

(21) Appl. No.: 17/615,890

(22) PCT Filed: Jun. 11, 2019

(86) PCT No.: PCT/EP2019/065155
§ 371 (c)(1),
(2) Date: Dec. 2, 2021

(87) PCT Pub. No.: WO2020/249185
PCT Pub. Date: Dec. 17, 2020

(65) Prior Publication Data
US 2022/0314966 A1  Oct. 6, 2022

(51) Int. Cl.
*B60W 30/045* (2012.01)
*B60T 8/1755* (2006.01)
(Continued)

(52) U.S. Cl.
CPC ....... *B60W 30/045* (2013.01); *B60T 8/17551* (2013.01); *B60W 10/18* (2013.01);
(Continued)

(58) Field of Classification Search
CPC ......... B60Q 9/00; B60T 17/22; B60T 8/1755; B60T 8/17551; B60W 10/18;
(Continued)

(56) References Cited

U.S. PATENT DOCUMENTS

| | | | |
|---|---|---|---|
| 6,597,975 B1 * | 7/2003 | Shinmura | B62D 5/0472 701/43 |
| 8,437,913 B2 * | 5/2013 | Wang | B62D 6/04 701/41 |

(Continued)

FOREIGN PATENT DOCUMENTS

| | | |
|---|---|---|
| DE | 102011001092 A1 | 10/2011 |
| WO | 2019072379 A1 | 4/2019 |
| WO | WO-2019072379 A1 * | 4/2019 .......... B60W 10/184 |

OTHER PUBLICATIONS

International Search Report and Written Opinion for International Patent Application No. PCT/EP2019/065155, dated Feb. 20, 2020, 13 pages.

*Primary Examiner* — Babar Sarwar
(74) *Attorney, Agent, or Firm* — Withrow & Terranova, PLLC (57) ABSTRACT

A method for estimating a longitudinal force difference $\Delta Fx$ acting on steered axle wheels of a vehicle, the method comprising obtaining data from the vehicle related to an applied steering torque $M_{steer}$ associated with the steered axle wheels, obtaining a scrub radius value $r_s$ associated with the steered axle wheels, and estimating the longitudinal force difference $\Delta Fx$, based on the obtained data and on the scrub radius $r_s$, as proportional to the applied steering torque $M_{steer}$ and as inversely proportional to the scrub radius $r_s$.

17 Claims, 5 Drawing Sheets

(51) Int. Cl.
  *B60W 10/18* (2012.01)
  *B60W 10/20* (2006.01)
  *B62D 6/00* (2006.01)
  *G07C 5/08* (2006.01)
  *B60Q 9/00* (2006.01)
  *B60T 17/22* (2006.01)

(52) U.S. Cl.
  CPC ............. *B60W 10/20* (2013.01); *B62D 6/003* (2013.01); *B62D 6/006* (2013.01); *G07C 5/0808* (2013.01); *G07C 5/0816* (2013.01); *B60Q 9/00* (2013.01); *B60T 17/22* (2013.01); *B60W 2510/20* (2013.01); *B60W 2510/202* (2013.01); *B60W 2520/14* (2013.01); *B60W 2520/26* (2013.01); *B60W 2520/28* (2013.01); *B60W 2530/00* (2013.01); *B60W 2552/00* (2020.02); *B60W 2710/18* (2013.01); *B60W 2710/207* (2013.01)

(58) Field of Classification Search
  CPC ............. B60W 10/20; B60W 2510/20; B60W 2510/202; B60W 2520/14; B60W 2520/26; B60W 2520/28; B60W 2530/00; B60W 2552/00; B60W 2710/18; B60W 2710/207; B60W 30/045; B62D 5/0472; B62D 6/003; B62D 6/006; G07C 5/0808; G07C 5/0816
  See application file for complete search history.

(56) References Cited

U.S. PATENT DOCUMENTS

| | | | |
|---|---|---|---|
| 8,554,438 B2 * | 10/2013 | Nakayama | B60T 8/17557 701/1 |
| 2003/0221894 A1 * | 12/2003 | Guldner | B60T 8/1755 180/402 |
| 2003/0221898 A1 | 12/2003 | Yasui et al. | |
| 2005/0096827 A1 * | 5/2005 | Sadano | B60T 7/22 701/1 |
| 2011/0004385 A1 * | 1/2011 | Ishimoto | B60T 7/12 188/106 F |
| 2011/0246040 A1 * | 10/2011 | Nakayama | B60T 8/17557 701/70 |
| 2012/0006603 A1 * | 1/2012 | Thomson | B62D 11/24 180/6.48 |
| 2014/0190759 A1 * | 7/2014 | Agnew | B60T 8/1755 180/402 |
| 2016/0325721 A1 | 11/2016 | Jonasson et al. | |

* cited by examiner

METHOD FOR ESTIMATING A LONGITUDINAL FORCE DIFFERENCE ACTING ON STEERED WHEELS

This application is a 35 USC 371 national phase filing of International Application No. PCT/EP2019/065155, filed Jun. 11, 2019, the disclosure of which is incorporated herein by reference in its entirety.

TECHNICAL FIELD

The present disclosure relates to methods, control units, and vehicles for estimating a longitudinal force difference acting on the wheels of a vehicle steered axle. There are also disclosed a number of applications for use in a vehicle which are at least partly based the estimated force difference.

The invention can be applied in heavy-duty vehicles, such as trucks and construction equipment. Although the invention will be described mainly with respect to cargo transport vehicles such as semi-trailer vehicles, the invention is not restricted to this particular type of vehicle but may also be used in other types of vehicles.

BACKGROUND

Advanced vehicle motion control systems are being introduced to support, e.g., autonomous drive functionality and to improve vehicle safety. These vehicle control systems obtain data related to present vehicle state from a plurality of sensors and perform vehicle motion control based on the data.

A vehicle generally experiences both longitudinal and lateral forces acting on the wheels of the vehicle. The longitudinal forces acting on the wheels of the vehicle steered axle are of particular interest for vehicle motion control systems since they affect vehicle steering characteristics.

To improve vehicle state estimation and motion control, it is desired to estimate these longitudinal forces, and in particular a difference between longitudinal forces acting on a pair of steered wheels on an axle. However, this estimation is not straight forward.

U.S. 2003/0221898 discloses a method for determining longitudinal forces acting on a pair of steered wheels. Signals from brake pressure sensors and wheel speed sensors are used for performing the calculations. The result is used for determining a steering torque required to compensate for the force difference.

However, there is a need for improved methods of determining longitudinal force differences acting on steered wheels.

SUMMARY

It is an object of the present disclosure to provide a method for estimating a longitudinal force difference $\Delta F_x$ acting on steered axle wheels of a vehicle. The method comprises obtaining data from the vehicle related to an applied steering torque $M_{steer}$ associated with the steered axle wheels. The method also comprises obtaining a scrub radius value $r_s$ associated with the steered axle wheels and estimating the longitudinal force difference $\Delta F_x$ based on the obtained data and on the scrub radius $r_s$, as proportional to the applied steering torque $M_{steer}$ and as inversely proportional to the scrub radius $r_s$.

Thus, a simple yet accurate estimation of longitudinal force difference acting on steered axle wheels of a vehicle is provided. The longitudinal force difference may, e.g., simply be estimated as $\Delta F_x = M_{steer}/r_s$ or using more advanced expressions involving $M_{steer}$ and $r_s$. The method does not require advanced and/or expensive sensors or powerful data processing resources which is an advantage. The method also enables a number of applications based on the estimated force difference, which will be described in the following.

According to aspects, the vehicle comprises an active steering system, and the obtaining comprises obtaining data from the active steering system related to the applied steering torque $M_{steer}$. An active steering system implemented in the vehicle often already provides data on applied steering torque. Thus, advantageously, some of the methods disclosed herein can be efficiently and cost effectively implemented in vehicles by re-using already existing data and control hardware. According to some such aspects, the obtained data from the active steering system comprises steering wheel torque $T_{steering}$ and a combined gain factor $K_{powersteer}$ through a hydraulic steering gear of the vehicle. The longitudinal force difference $\Delta F_x$ is then estimated based on a relationship $\Delta F_x = T_{steering} * K_{powersteer}/r_s$. In other words, the longitudinal force difference $\Delta F_x$ is proportional to the applied steering wheel torque $T_{steering}$ with account taken to a hydraulic steering torque gain factor $K_{powersteer}$, and again inversely proportional to the scrub radius $r_s$.

According to aspects, the obtained data from the active steering system comprises a pressure value, a current value or a voltage value related to the applied steering torque $M_{steer}$. Thus, advantageously, the applied steering torque need not be available, since the method can be implemented based on data input which is only indirectly related to applied steering torque, such as, e.g., an electric current value associated with an electric motor of the active steering system.

According to aspects, the active steering system comprises a steering angle feedback system configured to maintain a steering angle of the vehicle at a requested angle. If the active steering system is running a steering angle control loop, such that the steering angle of the vehicle is maintained at some requested steering angle even when disturbances are present, then the estimation of longitudinal force difference may become more accurate since the control loop may reduce impact of some vehicle dynamics that may otherwise influence the estimation accuracy to some degree. For example, if a steering angle controller is active and fast enough, then, even when $\Delta F_x$ is non-zero, the steering angle would be maintained at a near-constant level. If no such steering angle controller system is active, then a large $\Delta F_x$ may in some cases lead to a significant change in steering angle, which in turn means that aspects of the steering hardware potentially needs to be accounted for in order to maintain estimation accuracy.

According to aspects, the vehicle comprises one or more torque sensors or force sensors arranged in connection to a steering system of the vehicle. The obtaining then comprises obtaining data from the one or more torque sensors related to the applied steering torque $M_{steer}$. Thus, advantageously, some of the methods disclosed herein do not require a vehicle with an active steering system, since a torque sensor or force sensor can be used with similar effect.

According to aspects, the estimating comprises filtering a time series of obtained data values from the active steering system or from the one or more torque sensors. By filtering the obtained time series data values estimation accuracy can be improved since measurement noise and other disturbances are suppressed by the filtering, which is an advantage.

As mentioned above, there is disclosed herein a number of applications that can be implemented in the vehicle or elsewhere based on the estimated longitudinal force difference.

According to one such example application, the method comprises determining a relationship between a brake control input signal such as a brake chamber pressure value and a resulting brake force or torque applied to the steered wheels, by applying a plurality of brake control input signals at the steered wheels, and monitoring the longitudinal force difference $\Delta F_x$ for each applied brake control input signal, and determining the relationship based on the applied brake control input signals and on the resulting longitudinal force differences.

The relationship between brake control input signal, e.g., brake pressure values or other brake input magnitude values, and actual obtained brake force can be linear or can follow some other higher order relationships. Having knowledge about such relationships enables, e.g., real-time updating of control algorithms to account for variation in the relationships between output signal and obtained brake force, which is an advantage since more accurate vehicle control is enabled. For instance, according to an example, the method comprises estimating a brake gain $K_{BG_L}$, $K_{BG_R}$ associated with a steered wheel of the vehicle based on $\Delta F_x$ and on a solution to a system of equations;

$$p1 * \frac{K_{BG_L}}{R_L} - p2 * \frac{K_{BG_R}}{R_R} = \Delta F_{x_1}, \text{ and } p2 * \frac{K_{BG_L}}{R_L} - p1 * \frac{K_{BG_R}}{R_R} = \Delta F_{x_2},$$

where p1 and p2 are applied brake pressure values or the like, $K_{BG_L}$ and $K_{BG_R}$ are brake gains associated with left and right steered wheels respectively, and $R_L$ and $R_R$ are rolling radii associated with the left and right steered wheels, respectively. Advantageously, knowing a current and up-to-date brake gain enables more accurate braking operations since actual brake force obtained from a given set of brake control signals can be more accurately determined.

According to aspects, the method also comprises calibrating a brake system of the vehicle based on the determined relationship between brake control input signal and resulting brake force. For instance, this calibration can be performed by adjusting for known brake gains estimated according to the example above. Also brake gains can be estimated continuously in order to maintain an accurate value of the brake gain over time as, e.g., brake pad wear occur, and temperature varies.

According to another such example application, the method comprises detecting a fault in the vehicle by determining an expected longitudinal force difference $\Delta F_{x,expect}$ based on requested torques on left and right steered wheels respectively and on wheel rolling radii. The expected longitudinal force difference may, e.g., be determined as $\Delta F_{x,expect}=T_L/R_L-T_R/R_R$, where $T_L$ and $T_R$ are requested torques on left and right steered wheels respectively, and where $R_L$ and $R_R$ are rolling radii associated with the left and right steered wheels, respectively. The method then comprises comparing the expected longitudinal force difference $\Delta F_{x,expect}$ to the estimated force difference $\Delta F_x$, and detecting fault in the vehicle in case of a discrepancy between $\Delta F_{x,expect}$ and $\Delta F_x$. The allowed magnitude of discrepancy can, e.g., simply be a pre-configured threshold, or it can be an adaptive threshold configured depending on scenario. Other more advanced detection criteria are also applicable.

Thus, advantageously, fault in the vehicle can be reliably detected by the disclosed methods, which is an advantage.

According to aspects, the method also comprises triggering a warning signal or emergency maneuver by the vehicle in case fault in the vehicle is detected. Thus, advantageously, the disclosed methods can be used to trigger warning signals in a robust manner based on the estimation of longitudinal force difference.

According yet another example application, the method comprises controlling stability of the vehicle by determining a total yaw moment or torque imposed on the vehicle based on a relationship $M_{yaw}=\Delta F_x*L_w$, where $L_w$ is a track width of the front axle of the vehicle. The method also comprises allocating brake torques and/or steering angles to compensate for the total yaw $M_{yaw}$, thereby controlling stability of the vehicle. Thus, advantageously, a more stable vehicle operation is provided.

According to aspects, the method also comprises estimating longitudinal force acting on a first steered wheel as $F_{x,1}=\Delta F_x-F_{x,2}$, where $F_{x,2}=p_{C_2}*K_{BG_2}$, $p_{C_2}$ is a brake chamber pressure value or other brake control input signal associated with the second wheel, and $K_{BG_2}$ is a brake gain associated with the second wheel. This way improved vehicle control based on the estimated longitudinal force data is provided.

According to aspects, the method comprises monitoring a wheel speed value and/or a wheel slip condition associated with the steered axle wheels of the vehicle and detecting fault in the vehicle and/or classifying road condition also based on the wheel speed value and/or a wheel slip condition.

By monitoring wheel speeds and/or wheel slip an improved fault detection mechanism is provided. For instance, if a large difference in longitudinal force is estimated, but both wheels are in free rolling condition then it is likely that a fault in the brake system of the vehicle, or a tyre blow-out, or the like has occurred. However, if a large longitudinal force difference is detected and the wheel slip monitoring indicates a slipping wheel, then it is more likely that the difference is due to road conditions and should not be registered as a fault.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
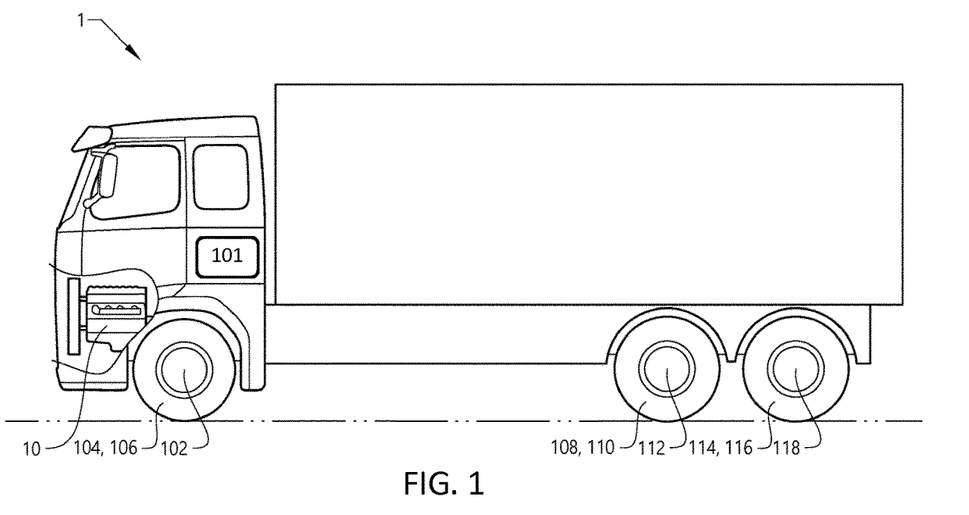
FIG. 1 schematically illustrates a vehicle for cargo transport.

FIG. 1 shows a vehicle 1 in the form of a truck. The vehicle 1 comprises a power source 10, here exemplified by a combustion engine. The vehicle 1 also comprises one or more control units 101 arranged to control various systems and functions comprised in the vehicle 1. The vehicle control unit 101 is, for instance, arranged to implement at least some of the methods and techniques described herein.

The vehicle 1 has a pair of steerable wheels 104, 106 arranged on a respective left and right hand side of a front axle 102 of the vehicle 1. The front axle 102 is the foremost located axle of the vehicle 1. The vehicle 1 also comprises a pair of first rear wheels 108, 110 connected to a first rear axle 112, and a pair of second rear wheels 114, 116 connected to a second rear axle 118. The first rear axle 112 is arranged in front of the second rear axle 118 as seen in the longitudinal direction of the vehicle 1. The pair of first rear wheels 108, 110 and the pair of second rear wheels 114, 116 are often but not always arranged as non-steerable wheels. The vehicle 1 also comprises a pair of first rear wheels 108, 110 connected to the first rear axle 112, and the pair of second rear wheels 114, 116 connected to the second rear axle 118. The front axle 102 of vehicle 1 has a track width $L_w$.

Figure 2:
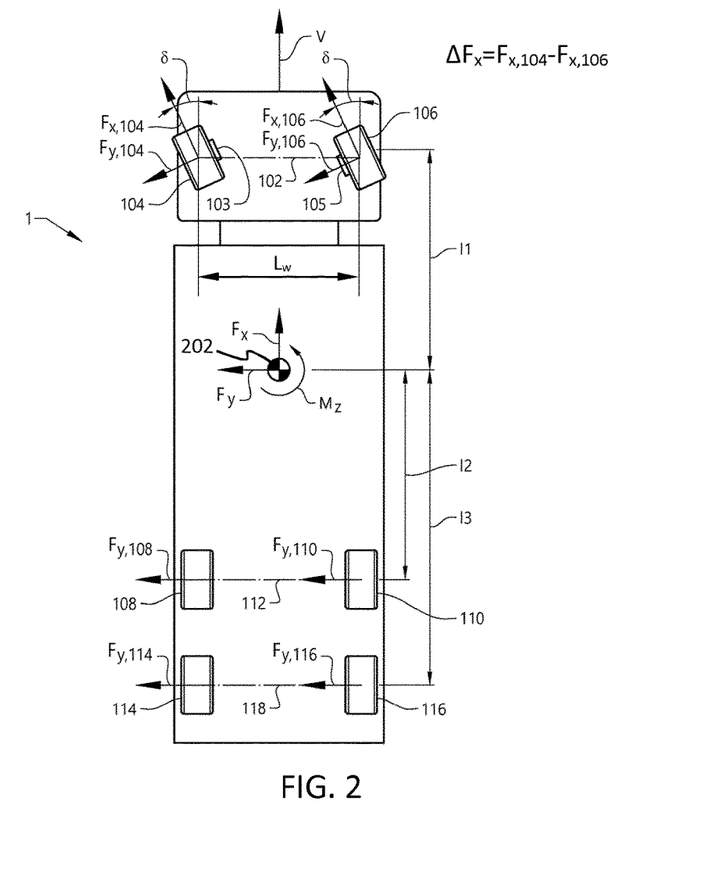
FIG. 2 shows example forces acting on a vehicle.

FIG. 2 illustrates some example forces acting on the vehicle 1 and its wheels. The pair of steerable wheels 104, 106 is executing a turning maneuver and are therefore arranged at a steering angle δ with respect to a vehicle forward direction. The steering angle δ is for simplicity in FIG. 2 illustrated as the same for the left 104 steerable wheel and the right 106 steerable wheel and is an angle of the wheels relative to a longitudinal axis of the vehicle 1. The vehicle 1 is operated at a vehicle speed indicated as V. The steerable wheels 104, 106 also comprise respective wheel torque actuators 103, 105.

Figure 3:
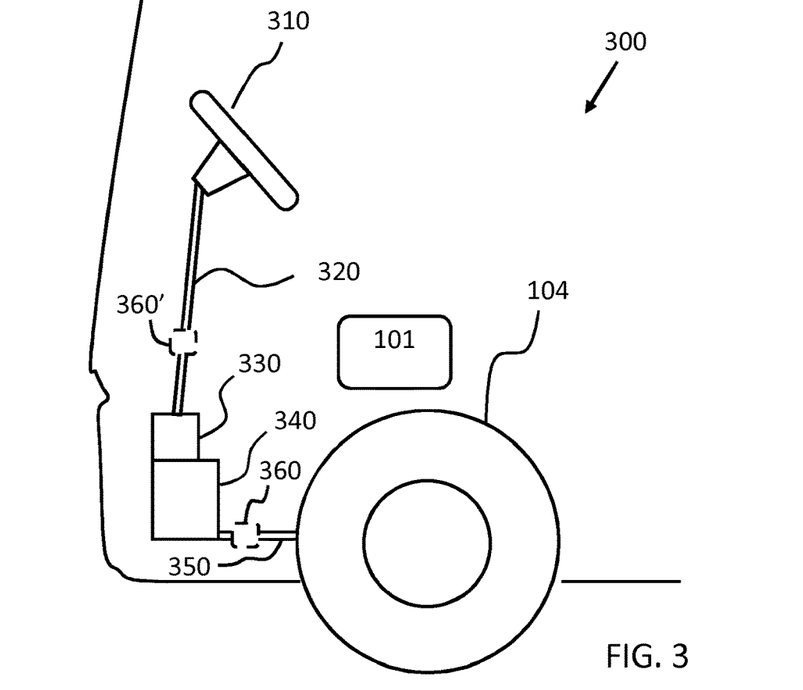
FIG. 3 schematically illustrates an active steering arrangement.

An example vehicle steering system will be discussed in more detail below in connection to FIG. 3.

The front axle 102 is arranged at a distance $I_1$, from a center of mass 202 of the vehicle 1, the first rear axle 112 is arranged at a distance $I_2$ from the center of mass 202 of the vehicle 1, and the second rear axle 118 is arranged at a distance $I_3$ from the center of mass 202 of the vehicle 1. The center of mass 202 is a position of the vehicle 1 at which total global forces affecting the vehicle 1 can be expressed in a known manner.

In the following, the x-axis is extending in the longitudinal direction of the vehicle 1, the y-axis is extending in the transversal direction of the vehicle 1 and the z-axis is extending in the vertical direction of the vehicle 1. During a turning maneuver, the vehicle 1 is exposed to a torque $M_z$ at the center of mass 202. Also, the vehicle is exposed to a global longitudinal force $F_x$ and a global lateral force $F_y$.

Moreover, when the steerable wheels 104, 106 of the front axle 102 is exposed to the steering angle δ, the steerable wheel 104 on the left hand side is exposed to a longitudinal force $F_{x,104}$ and a lateral force $F_{y,104}$ while the steerable wheel 106 on the right hand side is exposed to a longitudinal force $F_{x,106}$ and a lateral force $F_{y,106}$.

The sum of the lateral forces of the steerable wheels 104, 106 on the left and right hand sides can be expressed as a total front wheel lateral force. The sum of the front wheel longitudinal forces may be increased and reduced when e.g. propelling the vehicle or braking the vehicle.

The first rear wheels 108, 110 are exposed to respective lateral forces $F_{y,108}$ and $F_{y,110}$ and the second rear wheels 114, 116 are exposed to respective lateral forces $F_{y,114}$ and $F_{y,116}$. In the example of FIG. 2, the longitudinal forces of the pair of first rear wheels 108, 110 and the pair of second rear wheels 114, 116 is set to zero, i.e. the respective wheel is not exposed to any forces resulting from propulsion or braking.

Figure 4A:
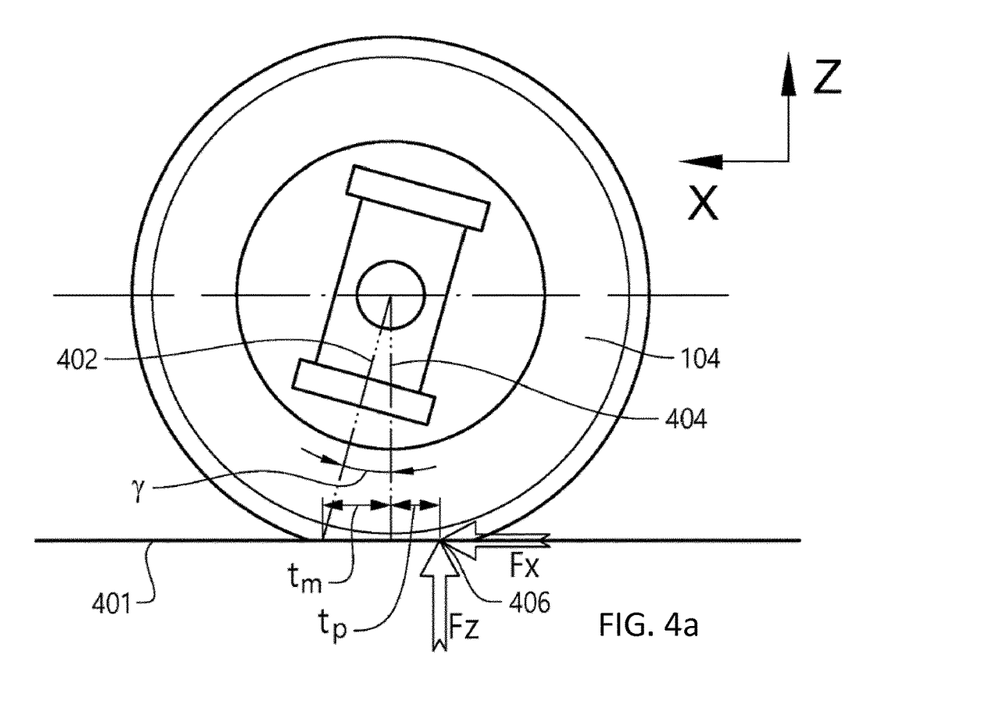
FIG. 4a illustrates a caster angle.
Figure 4B:
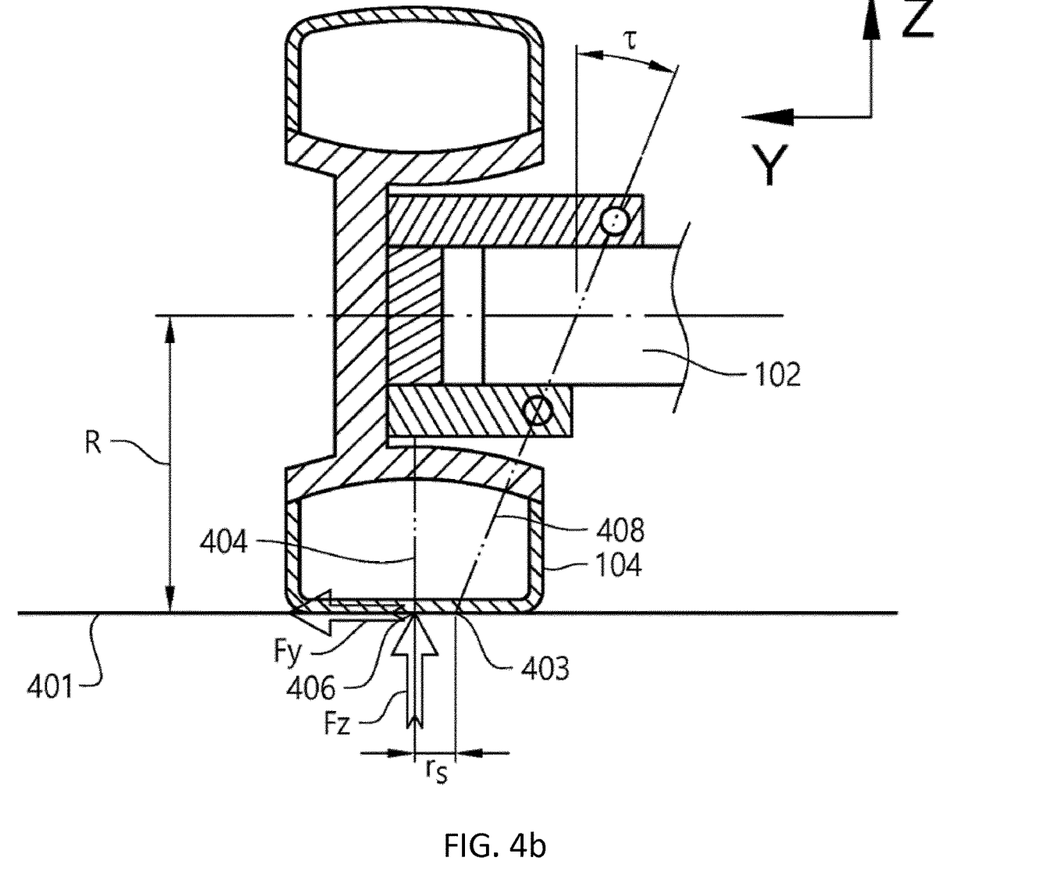
FIG. 4b illustrates a scrub radius.

Turning now to FIGS. 4a-4b which illustrate different views of the left steerable wheel 104 according to an example embodiment. In detail, FIG. 4a is a side view of the left steerable wheel 104 and FIG. 4b is a rear view of the left steerable wheel 104.

Starting with FIG. 4a, which is a side view of the left steerable wheel 104. The suspension (not shown) of the wheel 104 is arranged such that the wheel 104 is provided with a suspension caster angle γ which is defined as the angular displacement of a steering axis 402 from a vertical axis 404 of the left steerable wheel 104, measured in the longitudinal direction of the vehicle 1. The distance between the intersection of the road surface 401 and the steering axis 402, and the intersection of the road surface 401 and the vertical axis 404, also referred to as 'mechanical trail', is denoted as $t_m$. With the suspension of the wheel, the point of force application of the contact patch 406 between the wheel 104 and the road surface 401 will be located slightly offset in the longitudinal direction from the intersection of the road surface 401 and the vertical axis 404. This offset, also referred to as 'pneumatic trail', is denoted as $t_p$. The contact patch is the area of the tire in contact with the ground surface. Thus, the point of force application of the contact patch 406 between the wheel 104 and the road surface 401 is dependent on the suspension caster angle γ.

Turning to FIG. 4b, which is a rear view of the left steerable wheel 104. As can be seen, the effective wheel radius R is indicated as the distance between the front axle 102 and the road surface 401, and the wheel 104 is connected to the suspension by an inclined king pin axis 408, which inclination is indicated as T. The wheel 104 is rotated around the king pin axis 408 during a turning maneuver. The point of force application of the contact patch 406 between the wheel 104 and the road surface 401 is located at the intersection between the vertical axis 404 and the road surface 401. The vehicle 1, and in particular the steerable wheels 104, 106, are provided with a positive wheel scrub radius $r_s$. The wheel scrub radius $r_s$, or wheel suspension scrub radius, is defined as the distance between the point of force application of the contact patch 406 and the intersection 403 between the king pin axis 408 and the road surface 401. A positive wheel suspension scrub radius $r_s$ is generated when the intersection between the king pin axis 408 and the road surface 401 is located on an inner side of the vertical axis 404 as seen in the longitudinal direction depicted in FIG. 4b. When e.g. applying a brake torque on the left steerable wheel 104, the wheel will rotate around the king pin axis 408 due to the positive scrub radius $r_s$ causing the vehicle to turn to the left.

Scrub radius and caster angle are well known concepts and will therefore not be discussed in more detail herein.

Figure 5:
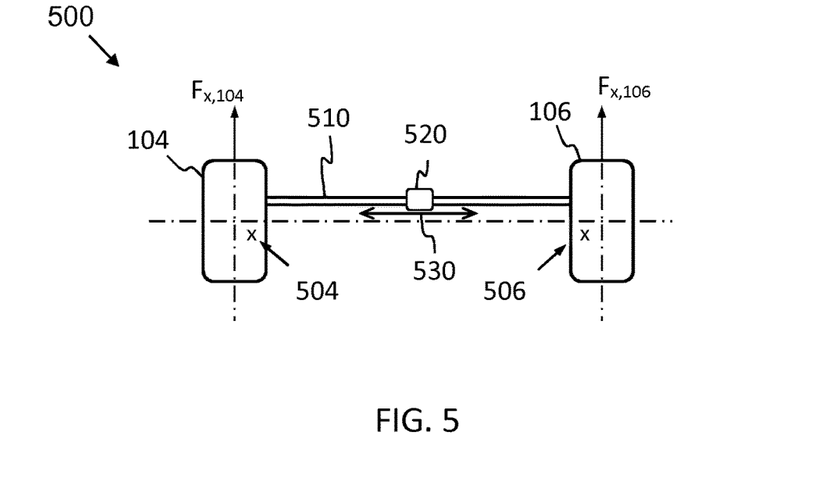
FIG. 5 shows an example vehicle steering arrangement.

FIG. 5 shows an example vehicle steering system 500. A steering torque is applied to the wheels via a steering gear (not shown in FIG. 5) connected to a wheel knuckle via one or more link rods (not shown in FIG. 5). A tie rod 510 connects the steerable wheels 104, 106. As the wheels are steered, the tie rod moves laterally 530. The steering torque discussed herein is the torque acting on the wheels which also causes the tie rod to move laterally. A steering torque may alternatively be applied to the steering arrangement via actuators 520 arranged connected to the tie rod, although this type of configuration is not common for trucks.

A longitudinal force difference $\Delta F_x = F_{x,104} - F_{x,106}$ gives rise to a steering torque $M_{steer} = \Delta F_x * r_s$. The underlying mechanics of this steering torque were discussed in, e.g., WO 2019/072379 A1 and will therefore not be discussed in more detail herein.

The methods and control units disclosed herein are based on the realization that the steering torque $M_{steer}$, or, equivalently, a lateral steering force acting on the tie rod 510, or a force acting on a link rod or knuckle, can be obtained from a torque sensor, a force sensor, or from an active steering system that works against this torque to maintain a given turning operation by the vehicle. Since the scrub radius is fixed and can be obtained from, e.g., vehicle design data, the longitudinal force difference can be estimated based on the relationship $\Delta F_x = M_{steer}/r_s$. I.e., a proportional relationship between longitudinal force difference $\Delta F_x$ and applied steering torque $M_{steer}$, and an inversely proportional relationship between longitudinal force difference $\Delta F_x$ and scrub radius $r_s$.

Figure 7:
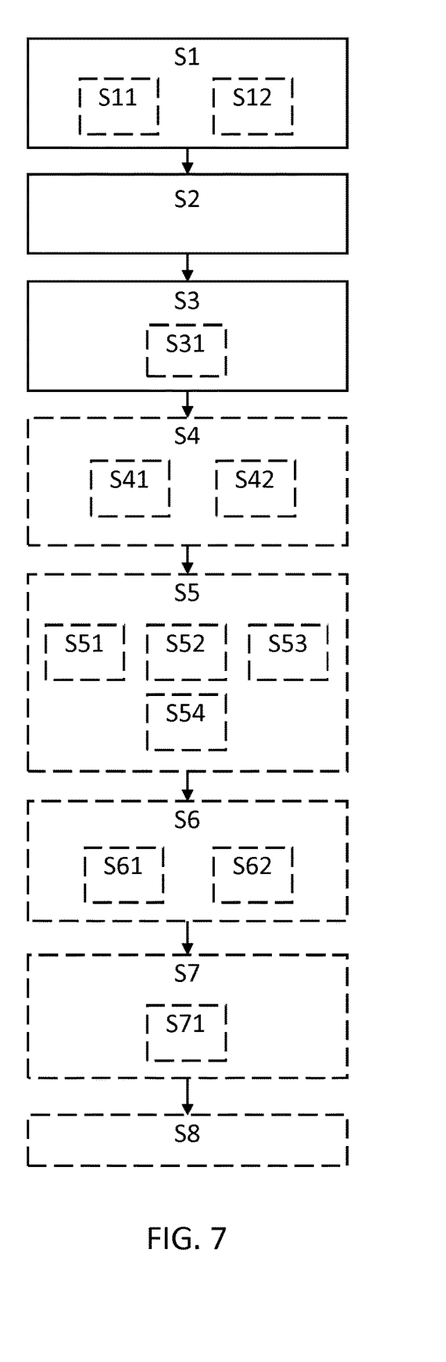
FIG. 7 is a flow chart illustrating methods.

With reference to FIG. 7, there is disclosed herein a method for estimating a longitudinal force difference $\Delta F_x$ acting on steered axle 102 wheels 104, 105 of a vehicle 1. The method comprises obtaining S1 data from the vehicle 1 related to an applied steering torque $M_{steer}$ associated with the steered axle wheels 104, 105, obtaining S2 a scrub radius value $r_s$ associated with the steered axle wheels 104, 105, and estimating S3 the longitudinal force difference $\Delta F_x$ based on the obtained data and on the scrub radius $r_s$, as proportional to the applied steering torque $M_{steer}$ and as inversely proportional to the scrub radius $r_s$.

For instance, the longitudinal force difference may simply be determined as $\Delta F_x = M_{steer}/r_s$. However, it is appreciated that the longitudinal force difference can be estimated in many different ways based on the proportional relationship between longitudinal force difference and applied steering torque, and on the inversely proportional relationship between longitudinal force difference and scrub radius. Proportionality constants a and b may, e.g., be used in a more general expression given by $\Delta F_x = a*M_{steer}/b*r_s$. Other more advanced expressions can also be used with similar effect. For instance, at larger steer angles factors a and b may not be constant but known. This relationship is most accurate when there is little or no movement in the steering system, i.e., the steer angle is near constant. When the steer angle is not in steady state there will be acceleration, inertia and friction terms which may be considered for increased accuracy.

The difference can, e.g., be directly calculated, or it can be estimated based on a model built around the relationship between longitudinal force difference and applied steering torque and scrub radius. Thus, it is appreciated that the relationship $\Delta F_x = M_{steer}/r_s$ should be given a broad interpretation to encompass also similar expressions for longitudinal force difference as function of scrub radius and applied steering torque.

Vehicles equipped with an active steering system can often provide a measurement of their applied steering torque. When a difference in longitudinal force is present on opposite sides of the steered axle, this can be observed in the active steering system's applied torque (i.e. the larger the difference in longitudinal forces acting on the wheels on the steered axle, the larger the required active steering system torque). According to some aspects the methods disclosed herein comprises obtaining S11 data from an active steering system 300 of the vehicle 1 related to the applied steering torque $M_{steer}$.

The active steering system may according to some other aspects comprise a feedback system configured to maintain a steering angle of the vehicle at a requested angle.

The data can also be obtained indirectly, for instance, a steering wheel torque applied by, e.g., an electrical motor may be known in addition to a hydraulic gain applied onto the electrical motor generated torque. In other words, obtained data from the active steering system 300 may comprise steering wheel torque $T_{steering}$ and a combined gain factor $K_{powersteer}$ through a hydraulic steering gear 340 of the vehicle 1, whereupon the longitudinal force difference $\Delta F_x$ is estimated based on a relationship $\Delta F_x = T_{steering} * K_{powersteer}/r_s$.

The applied steering torque can also be inferred from, e.g., a pressure value, a current value or a voltage value related to the applied steering torque $M_{steer}$.

Also, some vehicles comprise torque sensors able to output applied steering torque. Thus, according to some aspects, the vehicle 1 comprises one or more torque sensors 360, 360' arranged in connection to the steering system of the vehicle 1. The method then comprises obtaining S12 data from the one or more torque sensors 360, 360' related to the applied steering torque $M_{steer}$.

It is appreciated that various known filtering techniques and noise suppression signal processing techniques, e.g., Kalman filtering, can be applied to the obtained data values in order to improve performance of the force difference estimation. In other words, the estimating optionally comprises filtering S31 a time series of obtained data values from the active steering system 300 or from the one or more torque sensors 360, 360'.

Given an estimate of $\Delta F_x$ obtained by the methods discussed above, a number of applications and vehicle functions can be realized and/or improved compared to known methods. An overview of such applications will now be given, with reference to FIG. 7.

These applications are not directly dependent on the methods of determining longitudinal force difference disclosed herein but can be used with any methods for determining longitudinal force difference.

Unintentional uneven brake torque distribution on the front axle of a truck can result in severe 'pulling' of the vehicle to one side and possible vehicle instability. Such a situation can occur when the brake system does not correctly calculate the force generated at each of the front wheels; this could be due, e.g., to bad calibration of brake pressure transducers, errors in pressure estimation, different brake gains at different wheels, mechanical failure in brake actuator, etc.

If the actual difference in braking force between two wheels on the same axle can be determined, this information can be used by the vehicle motion controller to adapt the actuator requests to deal with the situation and to prevent vehicle instability. By adapting actuator requests in this way, requirements on, e.g., the brake system hardware may be relaxed, which is an advantage.

Large variations in 'brake gain', i.e., the proportionality factor between brake control input signal like brake chamber pressure value and actual brake force in the brake system can be seen in normal driving. The brake gain can be influenced by, e.g., brake pad wear, temperature, dirt, corrosion, mechanical adjustment in the brake actuator, etc. It is difficult to sense the 'actual' brake gain during normal driving. Accurate knowledge of the current vehicle brake gain is needed to be able to achieve predictable and accurate brake torque responses from the brake system.

Figure 6:
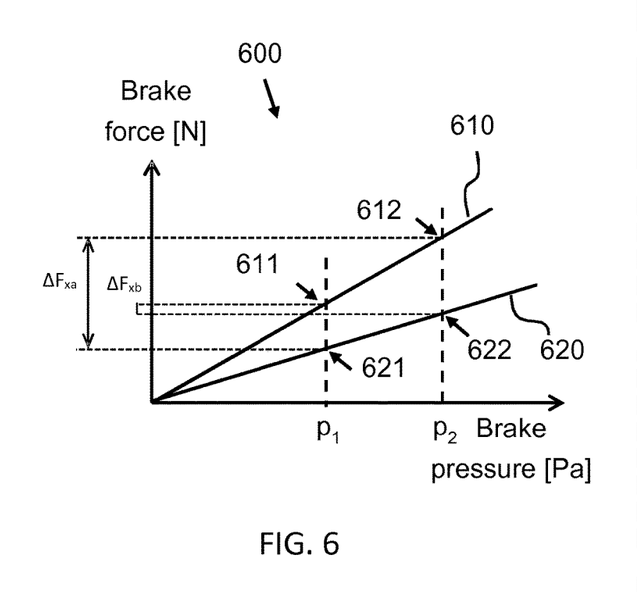
FIG. 6 is a graph illustrating example brake forces vs brake pressure.

With reference to FIG. 6, a method for estimating brake gain will now be described. The brake gains $K_{BG_L}$, $K_{BG_R}$ on the left and right steered wheels 104, 106, respectively, represent proportionality coefficients for conversion between brake control input signal p and actual brake force or torque $T_L$, $T_R$ on the left and right wheels, respectively.

I.e., $T_L = p * K_{BG_L}$, where $T_L$ is a brake torque in Newton-meters applied on the left wheel 104 of the vehicle 1. The brake torque can be converted into a brake force (in Newtons) by accounting for the wheel rolling radius in a known manner.

Having an accurate estimate of the brake gain $K_{BG}$ is important in order to ensure that global requests (for example for a given acceleration) are correctly fulfilled by the brake system. As there are typically no direct torque measurement sensors at the wheels, the brake gains are typically preprogrammed with a fixed value (even though it can vary significantly).

According to an example method, during normal braking events, the brake torques distributed to the front axle can be, on some occasions, deliberately sent such as there is a slightly higher brake torque request on one of the wheels of the steered axle compared to the other (e.g. the left hand brake device is sent a higher torque request than the right hand wheel). In a subsequent braking event, the other wheel can be given the higher request (the right hand wheel in this example).

The different brake control input signals should preferably be spaced somewhat apart in magnitude in order to distinguish system response more easily.

According to aspects, these calibration events should preferably only be carried out when no anti-lock braking system (ABS) interventions are present (e.g. no significant wheel slip during braking), and also preferably when the vehicle is driving in an approximately straight line.

By combining the achieved brake pressure (at each wheel) and the measured ΔFx from the steering system, the individual brake gains for each of the two wheels can be determined as illustrated in FIG. 6.

In the example 600 shown in FIG. 6, the brake gain 610 on the right hand wheel is larger than that on the left 620—note that in this figure the gradient of the lines is the brake gain divided by the wheel's rolling radius. This difference in brake gain could be due to pad wear, brake temperature, dirt, etc. Data from two braking events are used, where the total desired brake force is similar.

In the first braking event, a brake control signal $p_1$ is requested on the left hand wheel 621, and $p_2$ is requested on the right 612 (with $p_2$ being higher than $p_1$). A difference in longitudinal force is measured through the steering system, $\Delta Fx_a$. In the second braking event, $p_1$ is instead requested from the right hand wheel 611 and $p_2$ from the left 622. A difference in longitudinal force is again measured in the steering system, $\Delta Fx_b$.

The individual brake gains can now be inferred by rearranging the equilibrium equations in total torque for the two braking events, i.e.:

$$p1 * \frac{K_{BG_L}}{R_L} - p2 * \frac{K_{BG_R}}{R_R} = \Delta F_{x_a}$$

$$p2 * \frac{K_{BG_L}}{R_L} - p1 * \frac{K_{BG_R}}{R_R} = \Delta F_{x_b}$$

As long as the rolling radii $R_L$, $R_R$ are known the above equations can be solved for $K_{BG_L}$ and $K_{BG_R}$.

It is again appreciated that the brake control input signals p1, p2 are preferably separated by some distance in order to provide a more distinct and measurable longitudinal force difference.

An advantage of this brake gain estimation method compared to others known method is that this method can be used even when other wheels on the vehicle are braking whereas vehicle acceleration based brake gain estimation methods must take into account all longitudinal forces acting on the whole vehicle combination.

The example 600 in FIG. 6 assumes a strictly linear proportional relation between brake force and brake pressure or brake control input signal. It is appreciated that this relationship may be more complex, e.g., following a second order or higher order relationship. Such more complex relationships can also be estimated by the disclosed methods by, e.g., using more than two probing control signals, e.g., four or five brake pressure test signals.

To summarize, with reference to FIG. 7, there is disclosed herein methods comprising determining S4 a relationship between a brake control input signal and a resulting brake force on the steered wheels 104, 105, by applying a plurality of brake control input signals at the steered wheels 104, 105, and monitoring the longitudinal force difference $\Delta F_x$ for each applied brake control input signal, and determining the relationship based on the applied brake control input signals and on the resulting longitudinal force differences.

For example, the method may comprise estimating S41 a brake gain $K_{BG_L}$, $K_{BG_R}$ associated with a steered wheel 104, 105, based on $\Delta F_x$ and on a solution to a system of equations $$p1 * \frac{K_{BG_L}}{R_L} - p2 * \frac{K_{BG_R}}{R_R} = \Delta F_{x_1}, \text{ and } p2 * \frac{K_{BG_L}}{R_L} - p1 * \frac{K_{BG_R}}{R_R} = \Delta F_{x_2},$$

where p1 and p2 are applied brake pressure values, $K_{BG_L}$ and $K_{BG_R}$ are brake gains associated with left and right steered wheels 104, 105, respectively, and $R_L$ and $R_R$ are rolling radii associated with the left and right steered wheels 104, 105, respectively.

The determined relationship between brake control input signal such as brake chamber pressure and resulting brake force or brake torque can be advantageously used for brake system calibration. Thus, there is disclosed herein methods for calibrating S42 a brake system of the vehicle 1 based on the determined relationship between brake control input signal and resulting brake force.

A similar method can be devised based on acceleration instead of brake pressure, where the vehicle acceleration $a_x$ is measured (instead of steer wheel torque) when deliberate brake force differences are requested from any two wheels on the vehicle. At least two braking events are again required, where deliberate uneven braking is imposed, in a similar way to that described above (noting that now the sum of forces in the longitudinal direction is measured using $a_x$ signal, as opposed to comparing the difference to the steering wheel torque, as $\Sigma F=ma$. Two independent equations can once again be generated for two braking events and solved to obtain the individual brake gains:

$$p1 * \frac{K_{BG_L}}{R_L} + p2 * \frac{K_{BG_R}}{R_R} = m * a_{x_a} + F_{resist}$$

$$p2 * \frac{K_{BG_L}}{R_L} + p1 * \frac{K_{BG_R}}{R_R} = m * a_{x_b} + F_{resist}$$

Where $a_{x_a}$ is the longitudinal acceleration measured for the first braking event, and $a_{x_b}$ is that obtained for the second braking event. m is the total vehicle mass and $F_{resist}$ is the sum of all resistance forces acting on the vehicle in the longitudinal direction (air drag, rolling resistance, slope, etc.)—in the equations above $F_{resist}$ is defined in the negative longitudinal direction.

This acceleration-based method can be combined with the steering torque-based method discussed above to improve the estimation of, e.g., brake gains, or to calibrate vehicle steering, or to detect faults in the vehicle steering system.

The methods disclosed herein can also be used for detecting fault in the vehicle 1, as will now be discussed. During normal operation, a vehicle control unit 101, such as a Vehicle Motion Management controller (VMM), may generate individual brake torque requests on the left and right hand wheels of the steered axle as well as on other axles of the vehicle in order to control vehicle motion. The requested wheel torques on the steered axle's wheels ($T_L$ and $T_R$ on the left hand and right hand wheels, respectively) can be used to calculate an expected difference in longitudinal brake force $\Delta F_{x,expect}=T_L/R_L-T_R/R_R$, where $T_L$ and $T_R$ are requested torques on left and right steered wheels 104, 105 respectively, and where $R_L$ and $R_R$ are rolling radii associated with the left and right steered wheels 104, 105, respectively, on the front axle. $\Delta F_{x,expect}$ can then be compared to the $\Delta Fx$ estimated by the herein disclosed methods. When a large difference is detected between expected and estimated longitudinal force difference, this can be interpreted as fault in the brake system on the front axle; which can be reported to the human driver and or to some VMM fault handler. This check should preferably only be carried out when no ABS intervention is present (i.e. there is no significant wheel slip on either of the wheels). The check is also preferably carried out only when the steering angle is constant or at least near constant, since otherwise there will be inertia effects influencing the end result.

To summarize, with reference to FIG. 7, there is disclosed herein methods comprising detecting S5 fault in the vehicle 1, by;

determining S51 an expected longitudinal force difference as $\Delta F_{x,expect}=T_L/R_L-T_R/R_R$, where $T_L$ and $T_R$ are requested torques on left and right steered wheels 104, 105 respectively, and where $R_L$ and $R_R$ are rolling radii associated with the left and right steered wheels 104, 105, respectively, comparing S52 the expected longitudinal force difference $\Delta F_{x,expect}$ to the estimated force difference $\Delta F_x$, and detecting S53 fault in the vehicle 1 in case of a discrepancy between $\Delta F_{x,expect}$ and $\Delta F_x$.

The detection principle used, i.e., to decide when there is a large enough discrepancy between expected and estimated longitudinal force difference may vary between implementations. A pre-configured threshold may be enough in many applications, perhaps coupled with some time windowing function, i.e., a discrepancy is then an event where the magnitude of the difference between expected and estimated force difference is above some threshold for at least some pre-determined period of time. However, more advanced detection algorithms can of course also be applied, such as statistical detections methods and the like. Such detection principles and algorithms are known, and will therefore not be discussed in more detail herein.

According to aspects, the method also comprises triggering S54 a warning signal or emergency maneuver by the vehicle 1 in case fault in the vehicle 1 is detected.

The wheel speeds and/or wheel slip condition state should preferably also be monitored. If a large $\Delta F_x$ is estimated, but both wheels are free rolling (with no significant large slip) then it is likely that a fault in the brake system or a tyre blow out or the like has occurred. On the other hand, if a large $\Delta F_x$ is estimated and one wheel is at the same time in a slipping state due to, e.g., poor road friction, it instead suggests that the difference may be due to the road condition being slippery and should therefore not be registered as a fault. In that case one may instead 'trust' the $\Delta F_x$ estimate from the brake system more on the wheel that is not slipping.

To summarize, with reference to FIG. 7, there is disclosed herein methods comprising monitoring S8 a wheel speed value and/or a wheel slip condition associated with the steered axle 102 wheels 104, 105 of the vehicle 1, and detecting fault in the vehicle 1 and/or detecting a slippery road condition based on the wheel speed value and/or a wheel slip condition.

In situations where wheel slip occurs (e.g. during ABS intervention) the torque response of the brake device becomes more complicated due to the dynamics of the wheel, and non-linear behavior of the tire-road contact patch. In cases where ABS is active, large differences in longitudinal forces can develop on the left and right side of the vehicle, which may not be obvious from the brake control signals, e.g., the brake pressure signals (depending on the friction conditions present on the road on either side of the truck). In this case the estimated $\Delta F_x$ can provide a direct measurement of the difference in brake force achieved during the ABS event. The total yaw moment/torque imposed on the vehicle by this difference can be calculated via the relationship $M_{yaw}=\Delta F_x * L_w$, where $L_w$ is the track width of the vehicle 1 front axle shown in FIG. 2. With $M_{yaw}$ known, a vehicle control unit 101 can allocate brake torques and steering angles such that an opposing moment is achieved (e.g. by counter-steering some axles). The advantage of this method over other traditional stability control systems is that the required $M_{yaw}$ correction can be calculated before any large yaw rate or side slip occurs, whereas in traditional stability control methods an intervention would only occur once the vehicle actually started to 'spin-out'.

To summarize, with reference to FIG. 7, there is disclosed herein a method comprising controlling S6 stability of the vehicle 1 by;

determining S61 a total yaw moment or torque imposed on the vehicle 1 as $M_{yaw}=\Delta F_x*L_w$, where $L_w$ is a track width of the front axle of the vehicle 1, and allocating S62 brake torques and/or steering angles to compensate for the total yaw, thereby controlling stability of the vehicle 1.

'Split friction' braking is a difficult scenario for both human and automated drivers. In this situation hard braking is requested when the vehicle is experiencing different tyre-road friction conditions on the left and right sides of the vehicle—e.g. the left side of the vehicle may be driving on asphalt, while the right side is on ice.

It is important for the vehicle's motion control system to be able to detect such dangerous situations and adapt the braking requests sent to the different sides of the vehicle in order to prevent the vehicle from 'spinning out' or otherwise losing control. The detection and adaption must be relatively fast (e.g. less than one second response time) to prevent accidents in many scenarios.

In braking situations where one side of the vehicle is on a slippery surface (for example ice) and controlled by ABS (to prevent its wheels locking) and the other is on a less slippery surface (for example dry asphalt) the estimated $\Delta F_x$ can be combined with the estimated brake torques generated from the brake system to calculate the actual brake force achieved on the low friction side of the vehicle.

For example: if the right hand side of the vehicle is on a high friction surface and its wheels are not slipping, its brake pressure may be trusted as a reasonable estimate of the applied $F_x$ at that wheel;

$$F_{X_R}=p_R*K_{BG_L}$$

If the other side of the vehicle is on a low friction surface it will most likely experience wheel slip (and probably ABS intervention), this can be seen in the wheel speed signals. While the wheels are slipping $F_{X_L}$ cannot be easily estimated by the brake system, but it can be calculated by subtracting the estimated force generated on the high friction side $F_{X_R}$ from the estimated longitudinal force difference $\Delta F_x$.

$F_{X_L}$ can then be normalized with the vehicle tire's normal load to estimate the maximum available friction on this side of the vehicle. This can then be used to calculate the maximum torque capability on all wheels on that side of the vehicle (using known wheel loads in a known manner). This capability information can be used by the control unit 101 to ensure it is allocating actuator requests that are actually achievable given the current road conditions.

To summarize, with reference to FIG. 7, there is disclosed herein a method comprising estimating S7 longitudinal force acting on a first steered wheel as $F_{x,1}=\Delta F_x - F_{x,2}$, where $F_{x,2}=p_{C_2}*K_{BG_2}$, $p_{C_2}$ is a brake chamber pressure value associated with the second wheel, and $K_{BG_2}$ is a brake gain associated with the second wheel.

The disclosed methods optionally also comprise controlling S71 the vehicle 1 based on the estimated longitudinal force $F_{x,1}$ acting on the first steered wheel. For example, by limiting brake force on the high friction wheel so as to not unbalance the vehicle during split friction braking, vehicle stability can be maintained even in difficult split friction braking scenarios. It is appreciated that the first steered wheel may be either the left 104 or the right 106 wheel, and the second steered wheel is the other wheel.

Figure 8:
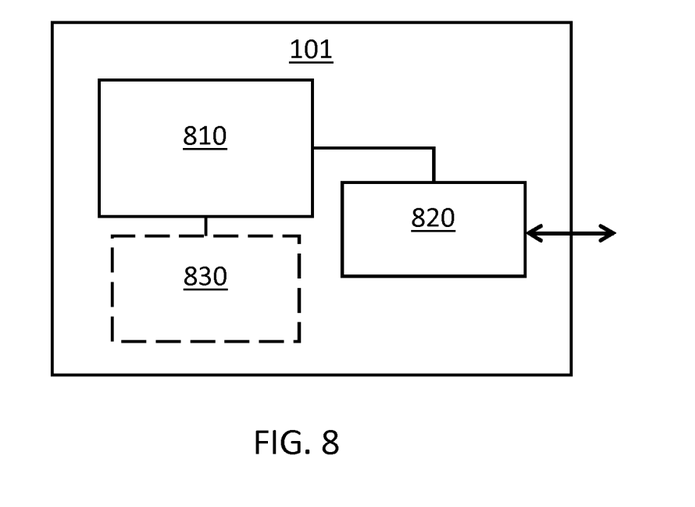
FIG. 8 schematically illustrates a control unit.

FIG. 8 schematically illustrates, in terms of a number of functional units, the components of a control unit 101 according to embodiments of the discussions herein. This control unit 101 may be comprised in the vehicle 1. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 101 to perform a set of operations, or steps, such as the methods discussed in connection to FIG. 8. For example, the storage medium 830 may store the set of operations, and the processing circuitry 810 may be configured to retrieve the set of operations from the storage medium 830 to cause the control unit 101 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 101 may further comprise an interface 820 for communications with at least one external device. As such the interface 820 may comprise one or more transmitters and receivers, comprising analogue and digital components and a suitable number of ports for wireline or wireless communication.

The processing circuitry 810 controls the general operation of the control unit 101, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

Figure 9:
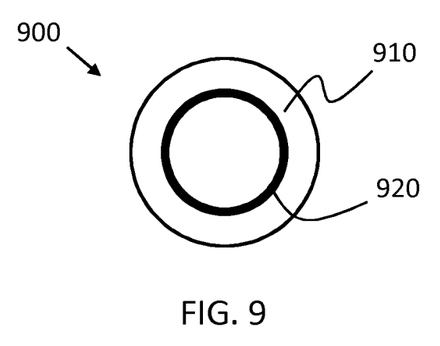
FIG. 9 shows an example computer program product.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

The invention claimed is:

1. A method for estimating a longitudinal force difference $\Delta F_x$ acting on steered axle wheels of a vehicle, the method comprising:
    obtaining, by a control unit, data from the vehicle related to an applied steering torque $M_{steer}$ associated with the steered axle wheels,
    obtaining, by the control unit, a scrub radius value $r_s$ associated with the steered axle wheels,
    estimating, by the control unit, the longitudinal force difference $\Delta F_x$ based on the obtained data and on the scrub radius $r_s$ as proportional to the applied steering torque $M_{steer}$ and as inversely proportional to the scrub radius $r_s$, and
    controlling, by the control unit, operation of the vehicle based on the longitudinal force difference $\Delta F_x$.

2. The method of claim 1, wherein the vehicle comprises an active steering system, and wherein the obtaining comprises obtaining data from the active steering system related to the applied steering torque $M_{steer}$.

3. The method of claim 2, wherein the obtained data from the active steering system comprises steering wheel torque $T_{steering}$ and a combined gain factor $K_{powersteer}$ through a hydraulic steering gear of the vehicle, and wherein the longitudinal force difference $\Delta F_x$ is estimated based on a relationship $\Delta F_x = T_{steering} * K_{powersteer} r_s$.

4. The method of claim 2, wherein the obtained data from the active steering system comprises a pressure value, a current value, or a voltage value related to the applied steering torque $M_{steer}$.

5. The method of claim 2, wherein the active steering system comprises a feedback system configured to maintain a steering angle of the vehicle at a requested angle.

6. The method of claim 1, wherein the vehicle comprises one or more torque sensors and/or one or more force sensors arranged in connection to a steering system of the vehicle, wherein the obtaining comprises obtaining data from the one or more torque sensors and/or force sensors related to the applied steering torque $M_{steer}$.

7. The method of claim 6, wherein the estimating comprises filtering a time series of obtained data values from the active steering system or from the one or more torque sensors.

8. The method of claim 1, comprising determining a relationship between a brake control input signal and a resulting brake force on the steered axle wheels, by applying a plurality of brake control input signals at the steered axle wheels, and monitoring the longitudinal force difference $\Delta F_x$ for each applied brake control input signal, and determining the relationship based on the applied brake control input signals and on the resulting longitudinal force differences.

9. The method of claim 8, comprising estimating a brake gain $K_{BG_L}$, $K_{BG_R}$ associated with a steered wheel, based on $\Delta F_x$ and on a solution to a system of equations $$p1 * \frac{K_{BG_L}}{R_L} - p2 * \frac{K_{BG_R}}{R_R} = \Delta F_{x1}, \text{ and } p2 * \frac{K_{BG_L}}{R_L} - p1 * \frac{K_{BG_R}}{R_R} = \Delta F_{x2},$$

where p1 and p2 are applied brake pressure values, $K_{BG_L}$ and $K_{BG_R}$ are brake gains associated with left and right steered wheels, respectively, and $R_F$ and $R_R$ are rolling radii associated with the left and right steered wheels, respectively.

10. The method of claim 8, wherein controlling, by the control unit, operation of the vehicle based on the longitudinal force difference $\Delta F_x$ comprises:
calibrating a brake system of the vehicle based on the determined relationship between the brake control input signal and the resulting brake force.

11. The method of claim 1, comprising detecting fault in the vehicle by:

determining an expected longitudinal force difference $\Delta F_{x,expect}$ based on requested torques on left and right steered wheels respectively, and on rolling radii associated with the left and right steered wheels, respectively,
comparing the expected longitudinal force difference $\Delta F_{x,expect}$ to the estimated force difference $\Delta F_x$, and
detecting fault in the vehicle in case of a discrepancy between $\Delta F_{x,expect}$ and $\Delta F_x$.

12. The method of claim 11, wherein controlling, by the control unit, operation of the vehicle based on the longitudinal force difference $\Delta F_x$ comprises:
triggering a warning signal or an emergency maneuver by the vehicle in case fault in the vehicle is detected.

13. The method of claim 1, wherein controlling, by the control unit, operation of the vehicle based on the longitudinal force difference $\Delta F_x$ comprises:
controlling stability of the vehicle by:
determining a total yaw moment or torque imposed on the vehicle as $M_{yaw} = \Delta F_x * L_w$, where $L_w$ is a track width of a front axle of the vehicle, and
allocating brake torques and/or steering angles to compensate for the total yaw, thereby controlling the stability of the vehicle.

14. The method of claim 1, comprising estimating longitudinal force acting on a first steered wheel as $F_{x,1} = \Delta F_x - F_{x,2}$, where $F_{x,2} = p_{C_2} * K_{C_2}$, $p_{C_2}$ is a brake chamber pressure value associated with a second wheel, and $K_{BG_2}$ is a brake gain associated with the second wheel.

15. The method of claim 14, wherein controlling, by the control unit, operation of the vehicle based on the longitudinal force difference $\Delta F_x$ comprises:
controlling the vehicle based on the estimated longitudinal force $F_{x,1}$ acting on the first steered wheel.

16. The method of claim 1, comprising monitoring a wheel speed value and/or wheel slip condition associated with the steered axle wheels of the vehicle, and detecting fault in the vehicle and/or classifying road condition also based on the wheel speed value and/or wheel slip condition.

17. A vehicle comprising a control unit configured to:
obtain data from the vehicle related to an applied steering torque $M_{steer}$ associated with the steered axle wheels,
obtain a scrub radius value $r_s$ associated with the steered axle wheels,
estimate, by the control unit, the longitudinal force difference $\Delta F_x$ based on the obtained data and on the scrub radius $r_s$ as proportional to the applied steering torque $M_{steer}$ and as inversely proportional to the scrub radius $r_s$, and
control, by the control unit, operation of the vehicle based on the longitudinal force difference $\Delta F_x$.

* * * * *